United States Patent
Lin et al.

(10) Patent No.: US 9,366,840 B2
(45) Date of Patent: Jun. 14, 2016

(54) BASE STRUCTURE OF LENS-FOCUSING MECHANISM AND METHOD FOR MANUFACTURING THE SAME

(71) Applicant: TDK TAIWAN CORPORATION, Taipei (TW)

(72) Inventors: Kun-Shih Lin, Yangmei Taoyuan (TW); Fu-Yuan Wu, Yangmei Taoyuan (TW); Hung-Lin Wang, Yangmei Taoyuan (TW); Shang-Yu Hsu, Yangmei Taoyuan (TW)

(73) Assignee: TDK TAIWAN CORPORATION, Taipei (TW)

( * ) Notice: Subject to any disclaimer, the term of this patent is extended or adjusted under 35 U.S.C. 154(b) by 246 days.

(21) Appl. No.: 13/961,563

(22) Filed: Aug. 7, 2013

(65) Prior Publication Data

US 2015/0043093 A1   Feb. 12, 2015

(51) Int. Cl.
  *G02B 7/02* (2006.01)
  *G02B 7/08* (2006.01)

(52) U.S. Cl.
  CPC ............. *G02B 7/08* (2013.01); *Y10T 29/49227* (2015.01)

(58) Field of Classification Search
  CPC .............. H01L 21/681; H01L 41/0475; H01L 41/0533; G02B 7/04; G02B 7/09; G02B 6/003; G02B 6/0088; G02B 6/3817; G02B 6/4204; G02B 6/4284; G02B 6/428; G02B 6/4256; G02B 7/022; G03F 7/70641; G03F 7/70758; G03F 9/7026; B01L 2300/046; B01L 2300/0654; H04N 5/2254; H04N 5/2257; H04N 5/2252; H04N 5/2253; G03B 3/10; G03B 2205/0046; G03B 17/00
  USPC .......................................... 359/819, 817, 823
  See application file for complete search history.

(56) References Cited

U.S. PATENT DOCUMENTS

2012/0050895 A1* 3/2012 Kotanagi ....................... 359/823

* cited by examiner

*Primary Examiner* — Alicia M Harrington
(74) *Attorney, Agent, or Firm* — Muncy, Geissler, Olds & Lowe, P.C.

(57) ABSTRACT

A method for manufacturing a base structure of lens-focusing mechanism first prepares a conductive member having at least two conductive parts, interconnection part, contacts and two conductive pins. The conductive parts have proximity ends separated and staggered to each other. An insulating base is formed by injection molding and encapsulates the conductive member wherein the conductive pins, the interconnection part and the contacts are exposed out of the insulating base. The interconnection part is cut and then a spring member is mounted to the insulating base and electrically connected to the conductive pins through the contacts. The present invention can solve the problem of difficulty in assembling conductive pins and connecting the spring member for the insulating base. The conductive member is arranged within the insulating base such that plastic material can be saved, the flatness, the stability and the anti-damage ability of base can be enhanced.

22 Claims, 7 Drawing Sheets

BASE STRUCTURE OF LENS-FOCUSING MECHANISM AND METHOD FOR MANUFACTURING THE SAME

FIELD OF THE INVENTION

The present invention relates to a base structure of lens-focusing mechanism and method for manufacturing the same, especially to a base structure of lens-focusing mechanism realized by voice coil motor (VCM), and method for manufacturing the same.

BACKGROUND OF THE INVENTION

The currently available mobile phones or tablet computers generally have built-in cameras. The built-in cameras need to be miniature and compact as the size of the mobile phones or tablet computers are demanded to be compact. The miniature cameras generally use voice coil motor (VCM) as lens-focusing mechanism. FIG. 1 shows a perspective view of a base used in a conventional voice coil motor. As shown in FIG. 1, at least two conductive pins are needed for connection to external substrate such that electric power or control signal can be supplied to the lens-focusing mechanism, namely, the voice coil motor.

The currently used conductive pins can be in one-piece form with spring tab; alternatively, the conductive pins can be separated with the spring tab. The conductive pins in one-piece form with spring tab have the advantage of ensured electric connection between the conductive pins and the spring tab. However, the conductive pins need to pass the base manually for mounting the conductive pins, the process is complicated. The conductive pins have the risk of breaking during mounting process due to the thin structure thereof.

FIG. 2 is the exploded view of the base shown in FIG. 1. As shown in FIG. 2, the two conductive pins 3 are separated with the spring tab 2. The arrangement shown in FIG. 2 has the advantage that the conductive pins 3 can be prevented from damage during assembling. However, the spring tabs 2 need to be first assembled in the base 1 and then the two conductive pins 3 are embedded into slots 4 in the base 1. Afterward, the upper ends of the conductive pins 3 are connected with the spring tabs 2 and then soldered together. In above arrangement, the damage of the spring tabs 2 can be prevented. However, the two conductive pins 3 are manually mounted and the conductive pins 3 are manually soldered to the spring tabs 2 to ensure electric connection, this process has difficulty for automatic production.

Moreover, the base of the voice coil motor is generally made of rubber material, the base fails to provide stability and integrity of overall structure when the voice coil motor is subject to reliability tests such as falling test, rolling test and anti-damage test. Therefore, the above-mentioned base for voice coil motor still need further improvement for the base structure and connection between the spring tab and the conductive pins.

SUMMARY OF THE INVENTION

The object of the present invention is to provide a base structure of lens-focusing mechanism and method for manufacturing the same, the base structure has the advantage of easy assembling and automatic manufacture. The unsatisfactory connection between the conductive pins and spring tab can be overcome. The cost of plastic material for the base can be reduced. The probability of poor assembling of conductive pins can be reduced. The physical reliability test can be enhanced by reinforcing the flatness of the base, enhancing the stability and anti-damage ability of the base.

Accordingly, the present invention provides a method for manufacturing a base structure for lens-focusing mechanism, comprising the steps of: preparing a conductive member having at least two conductive parts and two conductive pins, wherein the two adjacent conductive parts are connected by at least one interconnection part; forming an insulating base to encapsulate the conductive member wherein the conductive pins and the interconnection part are exposed out of the insulating base; and cutting the interconnection part to electrically isolate the two conductive parts. Finally, a spring member is mounted on the insulating base and the spring member is electrically connected to the contacts such that a first spring part of the spring member is electrically connected to one of the conductive pins and a second spring part of the spring member is electrically connected to another one of the conductive pins.

Accordingly, the present invention provides a base structure for lens-focusing mechanism comprising: a conductive member comprising at least two conductive parts, two conductive pins and two contacts, wherein the conductive pins are electrically connected to the respective contacts through the conductive parts; and an insulating base encapsulating the conductive member and exposing the conductive pins and the contacts, wherein each of the conductive parts has at least one proximity end, the proximity ends are separated and staggered to each other.

In one aspect of the present invention, the insulating base comprises a plurality of positioning posts and the spring member comprises a plurality of positioning holes corresponding to the positioning posts. The positioning posts are embedded into the positioning holes to mount the spring member on the insulating base.

In another aspect of the present invention, the insulating base comprises a plurality of through holes corresponding to the contacts to expose the contacts out of the through holes, the spring member comprises a plurality of electric-connection holes corresponding to the contacts. When the spring member is mounted to the insulating base, the contacts are embedded into the electric-connection holes to electrically connect the spring member to the conductive member.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Described herein are techniques for a rectifier structure. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
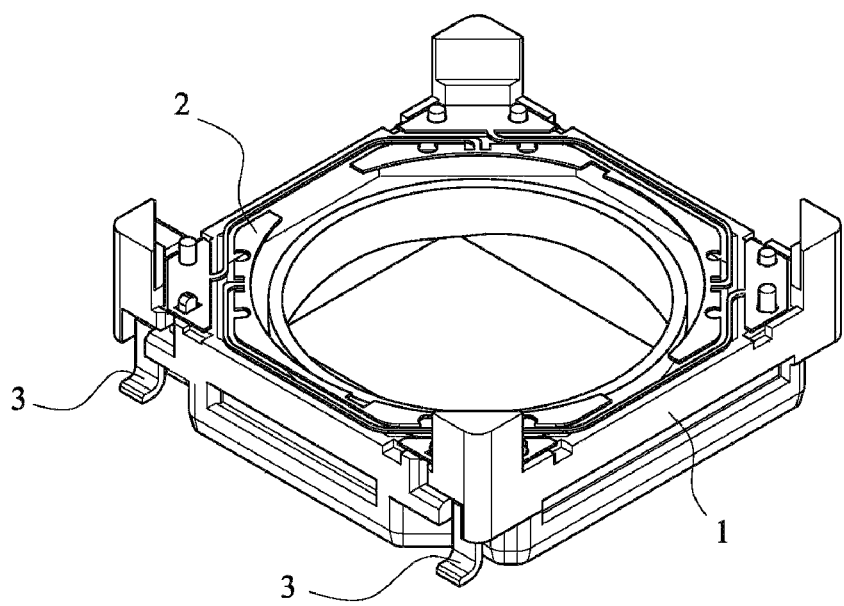
FIG. 1 shows a perspective view of a base used in a conventional voice coil motor.
Figure 2:
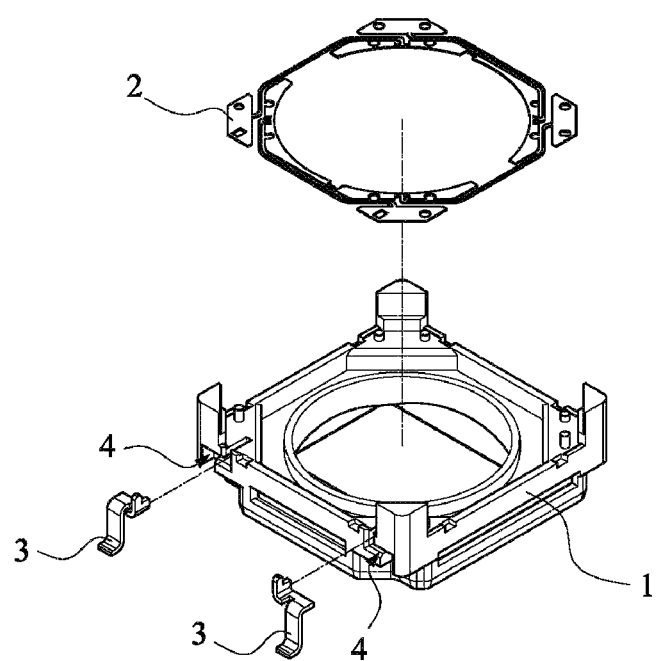
FIG. 2 is the exploded view of the base shown in FIG. 1.
Figure 3:
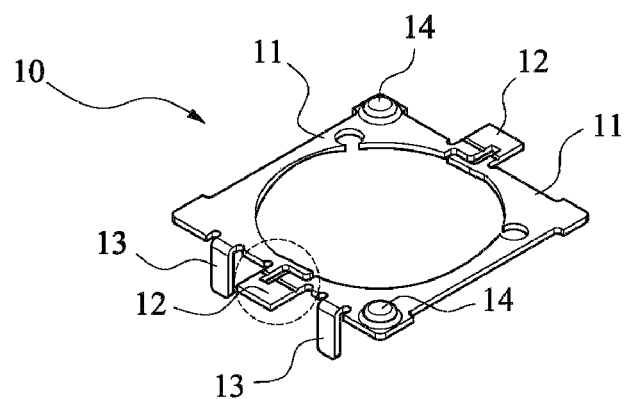
FIG. 3 shows the perspective view of the conductive member according to an embodiment of the present invention.
Figure 4:
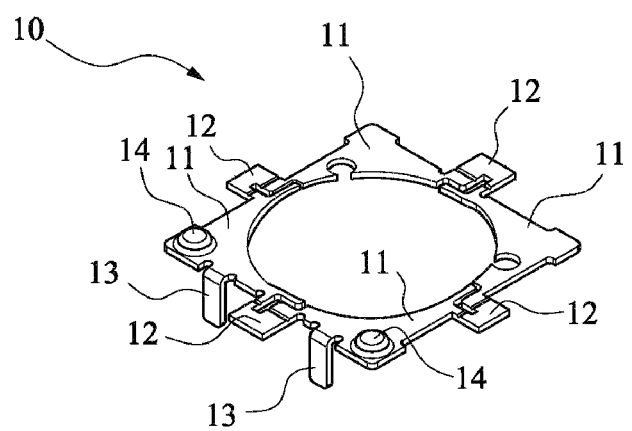
FIG. 4 shows the perspective view of the conductive member according to another embodiment of the present invention.

The present invention provides a base structure for voice coil motor focusing mechanism. FIG. 3 shows the perspective view of the conductive member according to the present invention. According to the present invention, a conductive member 10 having two conductive parts 11, two conductive pins 13 and two interconnection parts 12 connecting the two conductive parts 11 is prepared. According to another embodiment of the present invention, the number of the conductive parts 11 and the interconnection parts can be more than two. FIG. 4 shows the perspective view of the conductive member according to another embodiment of the present invention. The shown conductive member comprises four conductive parts 11 and four interconnection parts 12. However, the number of the conductive parts and the interconnection parts is not limitation to the scope of the present invention.

As shown in FIG. 3, the two conductive parts 11 are assembled into plate like shape with outer square and inner circle configuration. The conductive pins 13 are extended from respective conductive parts 11 and in one-piece form with the conductive parts 11. The conductive pins 13 and the conductive parts 11 can be non-coplanar. As shown in FIGS. 3 and 4 the conductive pins 13 are bent into L shape (or other shape) and the scope of the present invention is not limited to specific shape of the conductive pins 13. In the embodiment shown in FIG. 4, the two conductive pins 13 are in one-piece form with respective conductive parts 11. All of the conductive parts 11 are electrically isolated to each other and two adjacent conductive parts 11 are connected by the interconnection part 12.

Figure 5:
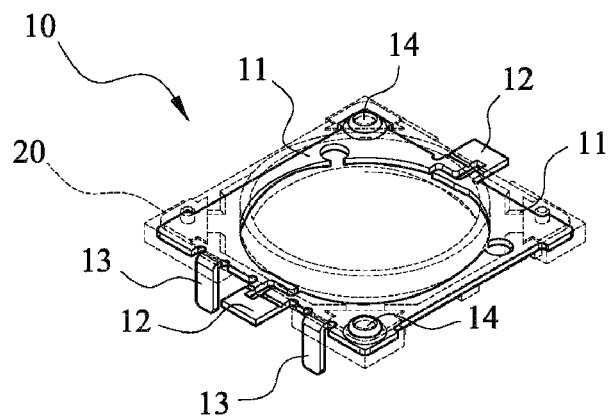
FIG. 5 shows the perspective view of the conductive member (solid line) and the insulating base (dashed line).
Figure 6:
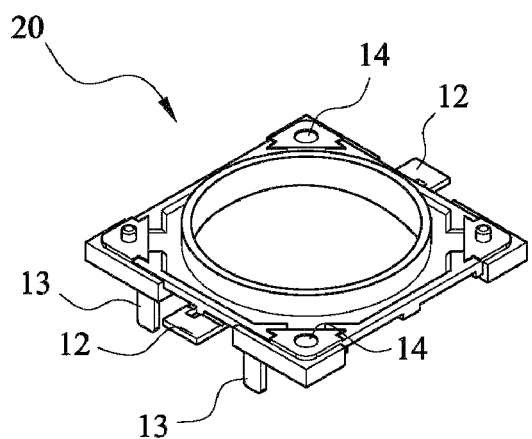
FIG. 6 shows the perspective view of the base assembled with the conductive member.

Please refer to FIGS. 5 and 6. FIG. 5 shows the perspective view of the conductive member (solid line) and the insulating base (dashed line) and FIG. 6 shows the perspective view of the base assembled with the conductive member. The insulating base 20 is formed around the conductive member 10 by inject molding of plastic material. The insulating base 20 encapsulates the conductive parts 11 of the conductive member 10 and exposes the conductive pins 13, the interconnection part 12 and the contact 14. After the inject molding process for the insulating base 20 is finished, the interconnection parts 12 are cut to electrically separate the conductive parts 11 in the insulating base 20.

Please refer now to FIGS. 3 to 6. According to the present invention, the conductive member 10 has two contacts 14 electrically connected to the conductive pins 13 through the conductive parts 11. In the embodiment shown in FIG. 4, the contacts 14 are arranged on the conductive parts 11 having the conductive pins 13. The insulating base 20 further comprises two through holes 21 corresponding to the contacts 14, and the contacts 14 expose out of the insulating base 20 through the through holes 21.

Figure 7:
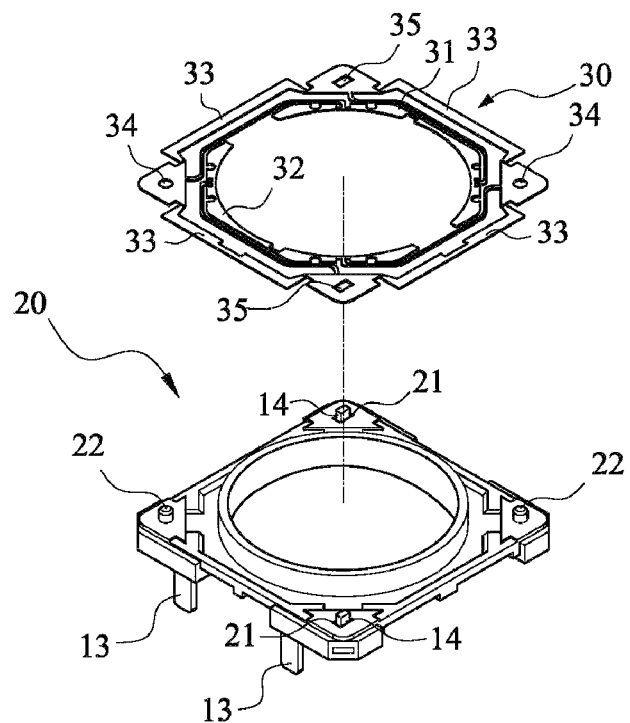
FIG. 7 shows the exploded view of the insulating base and the spring member.
Figure 8:
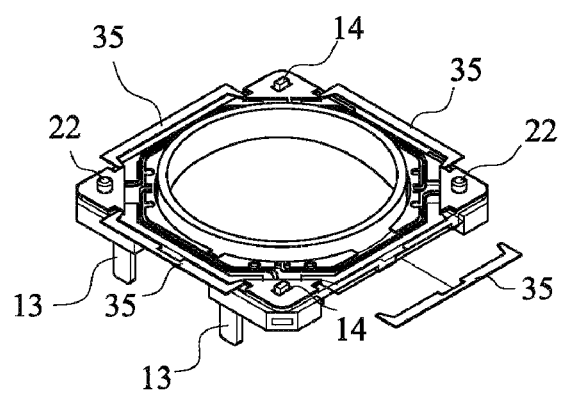
FIG. 8 shows the perspective view of the insulating base assembled with the spring member.

Please refer to FIGS. 7 and 8. FIG. 7 shows the exploded view of the insulating base and the spring member. FIG. 8 shows the perspective view of the insulating base assembled with the spring member. The present invention further comprises a spring member 30 electrically connected to the contacts 14 such that the spring member 30 is also electrically connected to the conductive pins 13. The spring member 30 comprises a first spring part 31, a second spring part 32 and a plurality of connection parts 33. The first spring part 31 is electrically isolated with the second spring part 32. The connection parts 33 are connected to outer portion of the first spring part 31 and the second spring part 32.

The insulating base 20 comprises a plurality of positioning posts 22. In the embodiment shown in FIGS. 7 and 8, the insulating base 20 is of square shape. The number of the positioning posts 22 is two and the two positioning posts 22 are located at two diagonal corners of the insulating base 20 while the through holes 21 are arranged at the remaining two diagonal corners of the insulating base 20. The spring member 30 also comprises two positioning holes 34 corresponding to the two positioning posts 22 and two electric-connection holes 35 corresponding to the two contacts 14. When mounting the spring member 30 to the insulating base 20, the two positioning posts 22 are embedded into the two positioning holes 34 while the two contacts 14 are embedded into the two electric-connection holes 35 such that the spring member 30 is electrically connected to the conductive member 10. Afterward, the contacts 14 are soldered to the electric-connection holes 35, or fixed to the electric-connection holes 35 by binding paste.

In the embodiment shown in FIGS. 3 and 4, the two contacts 14 on the conductive member 10 are of rounded convex shape to expose out of the through holes 21 of the insulating base 20 while the electric-connection holes 35 are of rounded shape to accommodate the two contacts 14. In the embodiment shown in FIGS. 7 and 8, the two contacts 14 on the conductive member 10 are of projecting post shape and bent upward from the conductive member 10 such that the two contacts 14 expose out of the through holes 21 of the insulating base 20. The two electric-connection holes 35 are two corresponding through holes such that the two contacts 14 are embedded into the two electric-connection holes 35.

After the spring member 30 is mounted to the insulating base 20, the connection parts 33 extend beyond the outer portion of the insulating base 20. The first spring part 31 is electrically connected to one conductive pin 13 and the second spring part 32 is electrically connected to another conductive pin 13. Afterward the connection parts 33 are cut to electrically isolate the first spring part 31 and the second spring part 32. Therefore, electric signals are transmitted to the first spring part 31 and the second spring part 32 through the two conductive pins 13, and then transmitted to the coil (not shown) of the voice coil motor through the spring member 30 to drive the voice coil motor for auto focusing.

Figure 9:
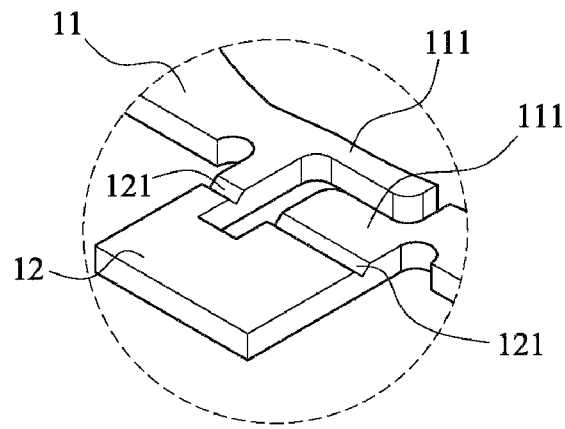
FIGS. 9-12 are partially enlarged views of the proximity end.
Figure 10:
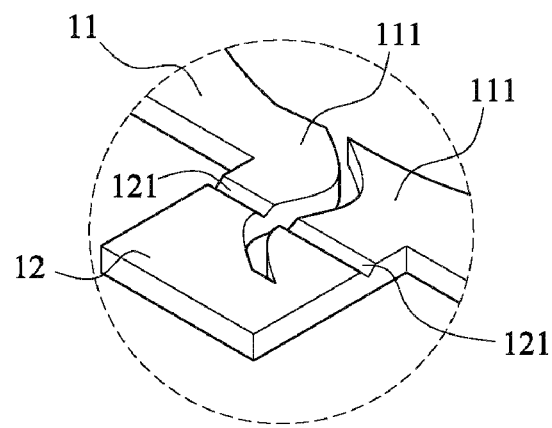
Figure 11:
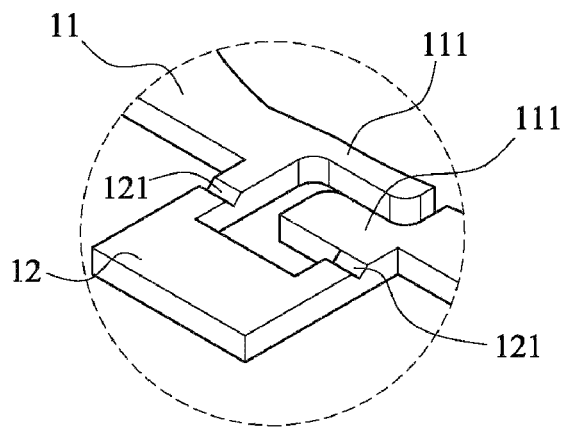
Figure 12:
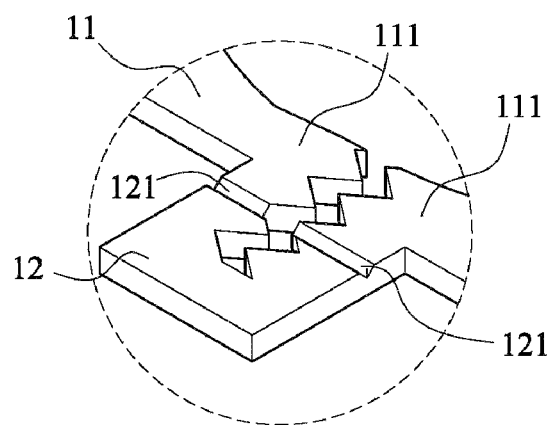

FIG. 9 is a partially enlarged view of the proximity end. The two conductive parts 11 and the interconnection part 12 have cutting grooves 121 at the connection thereof. Moreover, the two conductive parts 11 have proximity ends 111 separated and staggered with each other. As shown in FIG. 9, the proximity ends 111 are of L shape and corresponding to each other, and are connected to the interconnection part 12. Moreover, besides the L shape shown in FIG. 9, the proximity ends 111 can be of S shape as shown in FIG. 10. Moreover, each proximity end 111 of the two conductive parts 11 can have convex portion and concave portion corresponding to the countering proximity end 111 as shown in FIG. 11. The proximity ends 111 of the two conductive parts 11 can be toothed shape and corresponding to each other. The proximity ends ill of the two conductive parts 11 can be other symmetric or asymmetric shape, which is not limitation of the present invention. By the separated and staggered arrangement of the proximity ends 111, the injected molding material has smoothness on the gap between the proximity ends 111 of the two conductive parts 11 and will not form into dents. The strength of the injected molding material outside the proximity ends 111 can also be ensured.

As shown in FIG. 9, after the insulating base 20 encapsulates the conductive member 10, the cutting grooves 121 can facilitates the cutting of the interconnection part 12 while the injected molding material between the conductive parts 11 and the interconnection part 12 will not be influenced. The strength of the injected molding material for the insulating base 20 can be enhanced.

The insulating base 20 in the present invention is formed by injected molding outside the conductive member 10. The mounting step for the conductive pins can be saved in the manufacture process of the auto focusing mechanism. The metallic conductive member 10 is encapsulated by the insulating base 20, the strength of the insulating base 20 is improved. The flatness, stability and material strength of the insulating base 20 is also enhanced. The physical reliability tests such as falling test, rolling test and anti-damage test can be ensured.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A base structure for lens-focusing mechanism comprising:
    a conductive member comprising at least two conductive parts, two conductive pins, two interconnection parts and two contacts, wherein the conductive pins are electrically connected to the respective contacts through the conductive parts, each of the conductive parts has two proximity ends, the proximity end of one conductive part is adjacent to the proximity end of another conductive part and connected to the proximity end of another conductive part through one of the interconnection parts; and
    an insulating base encapsulating the conductive parts and exposing the conductive pins, the contacts and the interconnection part,
    wherein the conductive member further comprises two cutting grooves, each of the cutting grooves is defined between the interconnection part and the proximity end of each conductive part, whereby the interconnection part is spaced away from the conductive member via the cutting grooves to electrically separate the two conductive parts in the insulating base.

2. The base structure in claim 1, wherein the insulating base is formed by injection molding and outside the conductive member.

3. The base structure in claim 1, wherein each of the conductive pins is in one-piece form with one corresponding conductive part.

4. The base structure in claim 1, wherein the conductive parts are of plate shape and non-coplanar with the conductive pins.

5. The base structure in claim 1, wherein the proximity ends are of L shape, S shape, convex-concave shape, or toothed shape, and corresponding to each other.

6. The base structure in claim 1, further comprising
    a spring member arranged on the insulating base and electrically connected to the contacts to electrically connect to the conductive pins.

7. The base structure in claim 6, wherein the spring member comprises a first spring part electrically connected to one of the contacts and a second spring part electrically connected to another one of the contacts.

8. The base structure in claim 6, wherein the spring member comprises a plurality of positioning holes and the insulating base comprises a plurality of positioning posts, the positioning posts being embedded into the positioning holes to mount the spring member on the insulating base.

9. The base structure in claim 6, wherein the insulating base comprises a plurality of through holes corresponding to the contacts to expose the contacts out of the through holes, the spring member comprises a plurality of electric-connection holes corresponding to the contacts and the contacts are embedded into the electric-connection holes to electrically connect the spring member to the contacts.

10. The base structure in claim 9, wherein the contacts are of rounded shape or projecting post shape such that the contacts are exposed out of the through hole and embedded into the electric-connection holes.

11. A method for manufacturing a base structure for lens-focusing mechanism, comprising the steps of:
    preparing a conductive member having at least two conductive parts, two interconnection parts, two contacts and two conductive pins, wherein the conductive pins are electrically connected to the respective contacts through the conductive parts, each of the conductive parts has two proximity ends, the proximity end of one conductive part is adjacent to the proximity end of another conductive part and connected to the proximity end of another conductive part through one of the interconnection parts, the conductive member further comprises two cutting grooves, each of the cutting grooves is defined between the interconnection part and the proximity end of each conductive part;
    forming an insulating base to encapsulate the conductive parts wherein the conductive pins, the contacts and the interconnection part are exposed out of the insulating base; and
    cutting the interconnection part via the cutting grooves to electrically separate the two conductive parts in the insulating base.

12. The method in claim 11, further comprising: in the step of forming the insulating base to encapsulate the conductive member, forming the insulating base by injection molding and outside the conductive member.

13. The method in claim 11, further comprising: forming each of the conductive pins in one-piece form with one corresponding conductive part.

14. The method in claim 11, further comprising: the conductive parts to be of plate shape and non-coplanar with the conductive pins.

15. The method in claim 11, further comprising: forming the proximity ends to be of L shape, S shape, convex-concave shape, or toothed shape, and corresponding to each other.

16. The method in claim 11, further comprising: connecting the proximity ends to the interconnection part.

17. The method in claim 11, further comprising: electrically connecting at least two contacts of the conductive member to the respective conductive pins through the respective conductive parts.

18. The method in claim 17, further comprising:
mounting a spring member on the insulating base and electrically connecting the spring member to the contacts to electrically connect the spring member and the conductive pin.

19. The method in claim 18, further comprising: forming a plurality of positioning holes in the spring member and forming a plurality of positioning posts in the insulating base, and embedding the positioning posts into the positioning holes to mount the spring member on the insulating base.

20. The method in claim 18, further comprising: electrically connecting a first spring part of the spring member to one of the contacts electrically connecting a second spring part of the spring member to another one of the contacts.

21. The method in claim 20, wherein the spring member has a plurality of connection parts and the method further comprises: connecting the connection parts of the spring member to outer portion of the first spring part and the second spring part.

22. The method in claim 18, wherein in the step of electrically connecting the spring member to the contact, further comprises:
providing through holes on the insulating base and corresponding to the contacts, and exposing the contacts out of the through holes;
providing electric-connection holes on the spring member and corresponding to the contact, and embedding the contacts into the electric-connection holes to electrically connect to the spring member.

\* \* \* \* \*